United States Patent Office 3,501,516
Patented Mar. 17, 1970

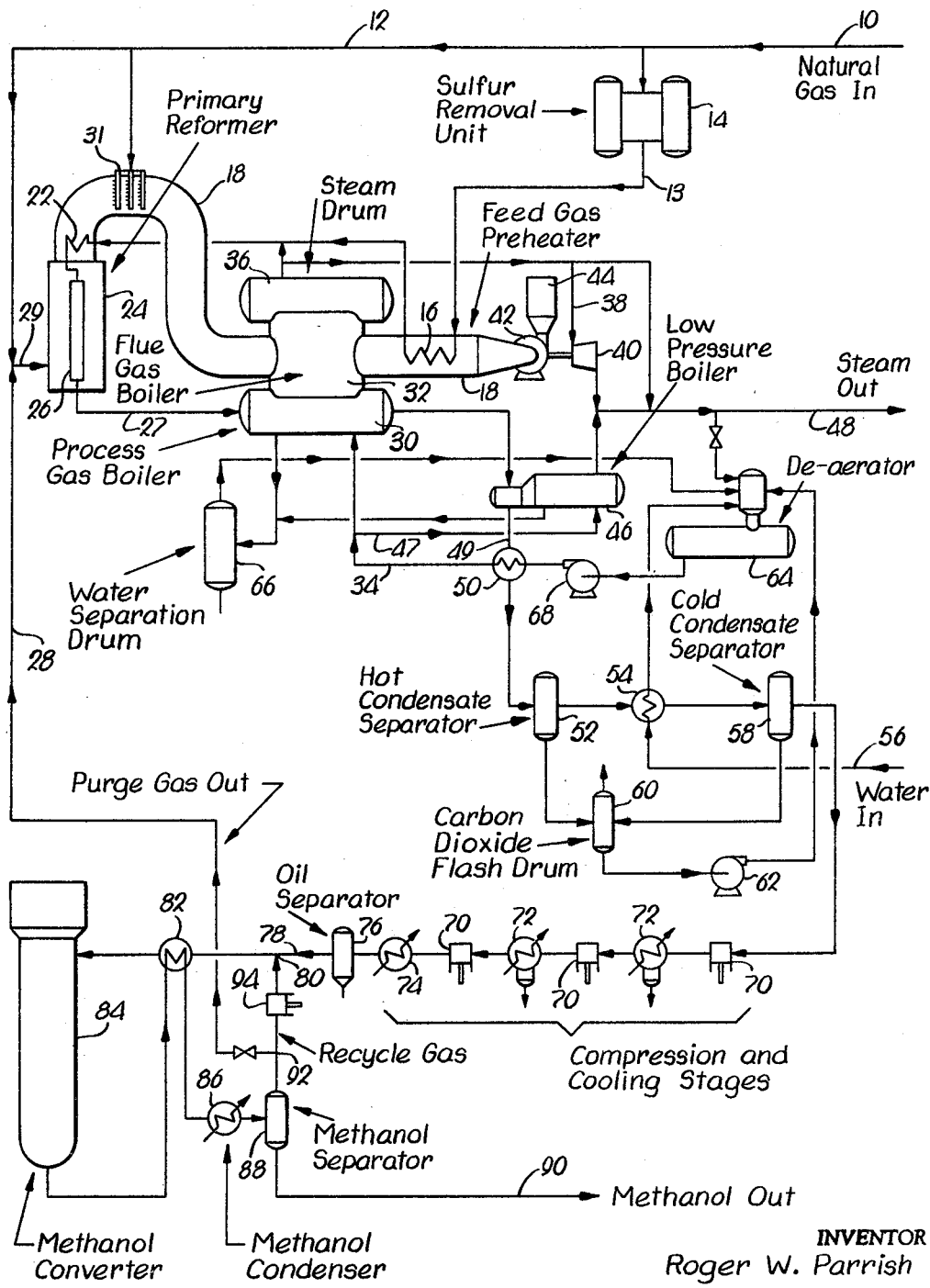

3,501,516
METHOD FOR PRODUCTION OF METHANOL
Roger W. Parrish, Independence, Mo., assignor to J. F. Pritchard and Company, a corporation of Missouri
Continuation-in-part of application Ser. No. 614,538, Feb. 8, 1967. This application Nov. 29, 1968, Ser. No. 779,735
Int. Cl. C07c 29/16
U.S. Cl. 260—449.5   6 Claims

ABSTRACT OF THE DISCLOSURE

Hydrocarbons are reformed in the presence of a reforming catalyst with steam as the sole added oxidant at a pressure between about 200 p.s.i.a. and approximately 1,000 p.s.i.a. and at a temperature correlated therewith in the range of about 1350° F. to approximately 1650° F to produce methanol synthesis gas comprising hydrogen, carbon monoxide, carbon dioxide, water and from 0 to about 18% inerts. The synthesis gas has an effective hydrogen to carbon monoxide ratio within the range of about 2.06 to approximately 3. After compression of the synthesis gas it is fed into the recycle loop of a methanol converter operated at a pressure within the range of about 500 p.s.i.a. to approximately 10,000 p.s.i.a. The effluent from the converter is treated to remove crude methanol and the remaining gas is then split with one portion being purged while the remainder is returned to the recycle loop. The proportions of the purge gas and that returned to the recycle loop are controlled so as to maintain the effective hydrogen to carbon monoxide ratio in the converter supply stream at a level of at least about 10:1 and preferably above 12:1.

Cross references

This is a continuation-in-part of my copending application Ser. No. 614,538, filed Feb. 8, 1967 and now abandoned and entitled "Method For Production Of Methanol," which in turn was a continuation-in-part of application Ser. No. 508,320, filed Nov. 17, 1965, of the same title and now abandoned.

This invention relates to a more economical method for producing methanol of higher purity then heretofore possible from a reformable hydrocarbon material and particularly relates to such an improved method wherein a methanol synthesis gas is produced from such a hydrocarbon material by a stream reforming operation conducted at higher than conventional pressures and a very large excess of hydrogen maintained in the gas stream supplied to the methanol converter.

Methanol may be produced by reacting carbon monoxide and hydrogen in the presence of a zinc, copper or chromium catalysts at pressures in the range of approximately 500 to 10,000 p.s.i.a. and at elevated temperatures in the order of 700 to 850° F. in accordance with the equation $CO+2H_2 \rightarrow CH_3OH$. Total conversion of the reactants to methanol is extremely difficult to achieve in a single reaction stage and, therefore, most commercial processes employ a loop arrangement where, after separation of the methanol from the converter effluent, the remainder of the effluent, which includes the unconverted reactants, is recycled through the converter. Commercially, a conversion to methanol of 3% to 50% per pass of the reactant in shortest supply is considered to be optimum.

The reactants for the synthesis of methanol may be provided by reforming hydrocarbons with mild oxidants such as water vapor or carbon dioxide in accordance with reactions typified by the reactions of methane for example, $$CH_4+H_2O \rightarrow CO+3H_2 \text{ and } 3CH_4+2H_2O+CO_2 \rightarrow 4CO+8H_2$$

Nickel catalysts are normally used to promote the reforming reactions and although from a theoretical standpoint most hydrocarbons are reformable, the starting composition is preferably natural gas, naphtha, LPG or acetylene off gas because of their rather plentiful supply and the fact that they do not generally contain significant quantities of alkanes having nine or more carbon atoms, unsaturated aliphatic hydrocarbons or aromatic hydrocarbons, all of which tend to produce excessive elemental carbon when exposed to reforming conditions. The presence of such elemental carbon is extremely undesirable in commercial applications because of undesirable clogging of the reformer. As a consequence, any of the alkanes through $C_8$, or mixtures thereof, are especially desirable starting compositions for the novel process set forth herein. However, any steam reformable hydrocarbon composition may be used in the present process as long as its use does not result in the production of deleterious amounts of elemental carbon in the reformer.

Previous commercial methanol processes have included a reforming operation conducted in accordance with the latter of the two reforming reactions shown above where carbon dioxide is included as an oxidant. The stoichiometry of the methanol synthesis reaction requires two moles of hydrogen for each mole of carbon monoxide and when carbon dioxide is utilized as a reformer oxidant, the reformer effluent can be caused to contain an effective 2:1 hydrogen to carbon monoxide ratio.

Based strictly on the above reforming reactions, and if it is assumed that the reaction conditions are such that negligible carbon dioxide will be present in the reformer effluent, it can be seen that when steam is used as the sole oxidant in the reforming of methane, four moles of synthesis gas would have to be compressed and one mole of methane would be consumed for each mole of methanol produced. On the other hand, when carbon dioxide is utilized as an oxidant along with steam in accordance with the above relationship, the production of one mole of methanol would require compression of only three moles of synthesis gas and consumption of only 0.75 moles of methane. In actual practice the reformer effluent will contain some carbon dioxide and for each mole of carbon dioxide, an extra mole of hydrogen will also be present in the effluent which is to be compressed. In general the synthesis gas produced in a conventional stoichiometric reforming operation will contain less carbon dioxide than the synthesis gas produced by using steam as the sole oxidant, because the temperature is usually higher in the former case. Hence, when steam is used as the sole oxidant the compression system may be required to compress even more than 1.33 times as much gas as must be compressed per mole of methanol produced when stoichiometric synthesis gas is utilized. Thus, in the past, it was universally thought that stoichiometric methanol synthesis gas was an economic necessity in the production of methanol.

It is, therefore, the primary object of this invention to provide an improved process for producing methanol wherein reforming of the hydrocarbon with steam as the sole oxidant is advantageously used to produce a methanol converter supply stream containing an excess of hydrogen far above that required for stoichiometric synthesis so that the effluent from the converter after removal of methanol therefrom may be split with the part purged being of sufficient volume to prevent undesirable build-up of inerts in the synthesis loop while the other part recycled to the converter infeed is sufficient to maintain the effective hydrogen to carbon monoxide ratio in the infeed at a level of at least 10:1 whereby the crude methanol product produced is not only of higher purity than heretofore possible but the catalyst used in the process has a longer life and the entire method may be carried out in a more economical plant than those heretofore required for similar methanol synthesis.

Methanol converters are generally provided with a recycle loop for returning unconverted hydrogen and carbon oxides to the converter inlet. Unreformed methane (or any other hydrocarbons which may be in the system) as well as traces of nitrogen, argon and helium will enter the loop but have no place to go because they are inert with respect to the methanol synthesis reaction. Thus, these constituents, termed "inerts" herein continue to build up in the loop, increasing the total volume which must be handled by the loop equipment and decreasing the relative concentrations of the reactants. Manifestly, the efficiency of the methanol converter is directly related to the concentrations of the reactants in the converter feed stream. Hence, it is desirable to minimize the level of inerts in the loop and particularly the methane content thereof by minimizing the quantity of unreformed methane in the methanol synthesis gas leaving the reformer. It is well known that the amount of unreformed methane in the synthesis gas will vary indirectly with temperature when all other variables are held constant. Also, it is known that such quantity will vary directly with pressure on the same basis. Hence, it has been believed that to minimize the quantity of unreformed hydrocarbons in the methanol reactor inlet stream, the temperature of the reforming operation should be maximized and the pressure thereof should be minimized.

As far as temperature is concerned, one of the primary considerations is the practical limitation imposed by materials of construction. In general, for a given material, the higher the pressure contained by the material, the lower the temperature must be to stay within a safe operating range based on the strength of the material. With these factors in mind, previous methanol processes have been designed to include low pressure reforming, utilizing a pressure in the range of approximately 50 p.s.i. where it was possible to convert more than 99% of the incoming methane with a commercially feasible quantity of catalyst.

Furthermore, the carbon dioxide needed to force the reformer to produce stoichiometric synthesis gas is generally recovered from the reformer flue gas. (Reforming is endothermic and fuel is typically combusted to provide the necessary heat.) Such flue gas is at atmospheric pressure and the carbon dioxide recovered therefrom must therefore, be compressed to the operating pressure of the reformer. This factor also caused previous methanol synthesis plants to be designed for low pressure reforming operations. As a result, natural gas streams, which are normally available at high pressure, were throttled to the pressure of the reforming operation and because the energy dissipated during such throttling could not be effectively conserved, the same was lost.

The equilibrium conditions inherent in former methanol plants under the operating parameters imposed on the system also resulted in a number of impurities being formed in the crude product that were difficult to remove. Exemplary were methylformate, acetone, dimethyl ether, ethanol, proponal and butanol.

The purer the crude methanol from the converter loop, the less work that is required in the distillation section of the plant to obtain a pure product. It is apparent also that the nature of the individual contaminants affects the distillation steps. Dimethyl ether, for example, has a low boiling point and is therefore easily removed. Ethanol, propanol, and butanol boil between methanol and water and cannot be removed as simply as water from methanol by distillation.

In most plants heretofore constructed, methanol and water are separated from the crude methanol product by distillation. Since the higher alcohols present in the product cannot go overhead or out of the bottom of the column, the concentration thereof tends to increase near the lower end of the distillation column, conventionally, a side stream of the product is withdrawn and separated by steam stripping until the concentrations build up to a point where two liquid layers can form and be removed by decanting. Very often, the distillation equipment represents fully 20% of the cost of the overall methanol plant.

It has been found, in spite of the above considerations which indicate that the reforming of hydrocarbon products to produce methanol synthesis gas must be conducted at low pressure, that high pressure reforming is economically feasible in connection with the production of methanol and, therefore, it is a very important object of the instant invention to provide a method for production of methanol which permits utilization of high pressure reforming with steam as the sole oxidant so that the advantages made available by high pressure reformed effluent containing an excess of hydrogen above that required for stoichiometric synthesis of methanol may be more fully exploited.

Although prior considerations have indicated that a stoichiometric methanol synthesis gas must be provided, it is, in fact, economically advantageous to have a methanol synthesis gas which includes a large excess of hydrogen therein and thus, it is an important aim of the present invention to provide a methanol production method which permits reforming without adding carbon dioxide to assure production of stoichiometric methanol synthesis gas whereby flue gas cleanup procedures and carbon dioxide compression processes are eliminated.

Another very important object of the instant invention is the provision of such a method which allows utilization of high pressure reforming with steam as the sole added oxidant to the end that methanol of a purity not believed possible may be produced in a manner previously thought to be impractical.

It has been found that with equal opportunity hydrogen is adsorbed on methanol synthesis catalysts at a much slower rate than carbon monoxide. Rate of adsorption of a component is generally directly proportional to the concentration of that component in the gas phase. The exact relationship between the equal opportunity rates of adsorption of carbon monoxide and hydrogen on methanol synthesis catalysts is not known; however, it is believed to exceed 6 to 1 in favor of carbon monoxide. At least, it is thought to be desirable to have an excess of hydrogen in the converter inlet stream. Based on such 6 to 1 ratio as well as the fact that twice as much hydrogen should be adsorbed to present a stoichiometric ratio of hydrogen to carbon monoxide in the absorbed phase on the catalyst, it is believed to be desirable for the actual hydrogen to carbon monoxide ratio to exceed at least about 10:1 and preferably 12:1 or more. In the past, certain attempts were made to try to increase the concentration of hydrogen in the loop; however, each atempt was frustrated because inerts and especially methane would build up in the loop along with the hydrogen and the dilution of the gas with methane and other inert constituents would offset any advantages gained by the increased hydrogen concentration. The present invention therefore, has, as one of its more important aims, the provision of an excess of hydrogen in the reformer effluent gas whereby a large excess of hydrogen is available for producing a high concentration of the same in the methanol converter recycle loop. In this respect, it is the corresponding purpose of the invention to provide a substantial loop purge procedure for eliminating excessive hydrogen and, at the same time, eliminate detrimental methane from the recycle loop.

The advantageous results stemming from the provision of a large excess of hydrogen in the recycle loop thus include: (1) The high effective hydrogen to carbon monoxide ratio produces a higher quality crude methanol product than previous methods because most of the by-products of the methanol synthesis reaction such as dimethyl ether, ketones, aldehydes and higher molecular weight alkanols are created by condensation reactions between methanol and carbon oxides, and since the concentration of hydrogen is high, the concentration of carbon oxides is correspondingly low and, therefore, the occurrence of such condensation reactions is inhibited; (2) The low carbon oxide concentration also inhibits production of iron and nickel carbonyls which are catalyst poisons with respect to methanol synthesis catalyst; (3) The danger of causing a runaway methanation reaction (in accordance with the relationships $$3H_2 + CO \rightarrow CH_4 + H_2O$$

and $4H_2 + CO_2 \rightarrow CH_4 + 2H_2O$) is greatly reduced because the large excess of hydrogen in the recycle loop is able to dissipate the heat produced by the highly exothermic methanation reaction and thereby prevent a temperature buildup which would promote the reaction; (4) The forced purge necessitated by the hydrogen excess permits rigid control of the concentration of diluents such as nitrogen and other inert gases such as argon and helium introduced into the system with the inlet natural gas or other raw material; and (5) The relatively large flow rate in the recycle loop permits closer control of process variables such as temperature and pressure.

In the drawing, the single figure is a schematic flow diagram of apparatus useful for production of methanol from a hydrocarbon product and utilizing the present improved process.

The process described in detail hereinafter with reference to the schematically shown apparatus of the drawing is understood to be illustrative of a preferred operating procedure only, and for this purpose, typical compositions, operating temperatures and pressures and the flow scheme itself are shown and described with particularity. However, it is to be understood that the specific conditions and compositions set forth are not intended as limitations on the process and the process conditions and parameters which follow the detailed description establish that various changes may be made in the method without departing from the invention. Furthermore, the specific pressures, temperatures, compositions and flow rates are descriptive of the state of the process after all of the various components of the plant have operated sufficiently long to reach a steady state.

Briefly, the present invention relates to a process of producing methanol wherein certain improvements are provided to effect economies in operation of the process and capital investment in equipment necessary to carry out the process. Specifically, one important aspect of the improved method involves reforming of a pressurized hydrocarbon such as methane at a pressure greater than was heretofore thought economically feasible in connection with the production of methanol. Furthermore, the reformer is operated without addition of carbon dioxide as an oxidant and therefore, an excess of hydrogen is provided.

A reformable hydrocarbon stream in the nature of natural gas is brought into the methanol plant illustrated in the drawing via line 10 at a temperature of about 60° F. and a pressure of approximately 460 p.s.i.a. A portion of the inlet gas is separated from the main stream and conveyed through line 12 for use as fuel in the process. The remainder of the inlet stream, which has a composition and flow rate as shown in Table I below, is directed along line 13 through a conventional adsorption unit 14 where undesirable hydrogen sulfide and mercaptans are removed if the same are present in the inlet stream.

TABLE I—INLET NATURAL GAS

| | Mol/hr. |
|---|---|
| Methane | 298.7 |
| Ethane | 18.7 |
| Propane | 1.5 |
| Butanes | 0.1 |
| Carbon dioxide | 1.6 |
| Nitrogen | 8.9 |

Upon leaving the sulphur removal unit 14, the desulphurized natural gas is conveyed through a preheater 16 situated in a hot flue gas duct 18 where the natural gas is heated to approximately 450° F. Steam is added to the natural gas at juncture 20 at a rate of 1566.5 mols/hr. and the mixture of steam and hydrocarbons is further heated to a temperature of approximately 1,000° F. in a high level mixed gas preheater 22 by indirect heat exchange with the hot flue gases leaving a primary reformer 24. The hot steam-hydrocarbon mixture is passed downwardly through a catalyst bed 26 located in reformer 24 to produce a reformer effluent stream leaving the reformer 24 through line 27 at a temperature of about 1530° F. and a pressure of approximately 320 p.s.i.a. The composition of the effluent stream in line 27 is shown in Table II below:

TABLE II.—REFORMER EFFLUENT STREAM

| | Mols/hr. |
|---|---|
| Methane | 39.0 |
| Carbon monoxide | 151.7 |
| Carbon dioxide | 151.7 |
| Hydrogen | 1033.6 |
| Nitrogen | 8.9 |
| Water | 1114.6 |

Whenever carbon monoxide, carbon dioxide, hydrogen and water are present in a stream such as the reformer effluent in line 27, these components will tend to shift toward equilibrium with respect to the water-gas shift reaction, $CO_2 + H_2 \rightleftharpoons CO + H_2O$. Further, it is believed that the methanol synthesis reaction involves only carbon monoxide and hydrogen. In any event, it has been found to be substantially empirically accurate to analyze the performance of a methanol synthesis plant in terms of effective quantities of hydrogen and carbon monoxide. In this analysis, all of the carbon dioxide is considered to be capable of shifting to carbon monoxide and thus, the effective quantity of carbon monoxide is the total amount of carbon oxides present. On the other hand, when a mole of carbon dioxide shifts to carbon monoxide, one mole of hydrogen is consumed. Therefore, the effective amount of hydrogen is taken as the quantity of hydrogen minus the quantity of carbon dioxide. Thus, $$R_{Effective} = \frac{H_2 - CO_2}{CO + CO_2}$$

is calculated on the basis of molar quantities of the constituents present in the gas stream. On this basis, the stream set forth in Table II includes, on an effective basis, 303.4 mols/hr. of carbon monoxide and 881.9 mols/hr. of hydrogen. That is to say $R_{Effective}$ or the effective hydrogen to carbon monoxide ratio is 2.91 to 1.

The basic reactions which take place in reformer 24 are endothermic; therefore, a source of heat is required. This heat is supplied by burning, in indirect heat exchange with catalyst bed 26, either natural gas supplied through line 12, methanol loop purge consisting chiefly of hydrogen supplied through line 28, or mixtures thereof. This fuel gas is introduced into the outer chamber of reformer 24 through line 29 where it is burned and combustion products therefrom are withdrawn from the reformer through duct 18. The hot reformer effluent gas is sent through line 27 into the mud drum 30 of a high pressure process gas boiler 32 situated immediately downstream from reformer 24 where the effluent is in heat exchanging relationship with boiler water brought into the mud drum through line 34.

After passing in heat exchange relationship with the steam-hydrocarbon mixture in preheater 22, the hot flue gases in duct 18 are also passed in heat exchanging relationship with the water in boiler 32. The energy extracted from the reformer effluent stream and the flue gas stream during the cooling thereof serves to heat and vaporize the water in boiler 32 thus producing high pressure steam which is accumulated in steam drum 36 of boiler 32. A portion of this high pressure steam is mixed with the incoming natural gas as described above, and another portion is conducted through line 38 to drive a turbine 40 which is coupled to a blower 42. Blower 42 operates to draw flue gases from reformer 24 through duct 18 which eventually are brought into heat exchanging relationship with inlet natural gas in preheater 16 before being expelled as cool gas from stack 44. It is to be noted that an auxiliary heater 31 is provided in duct 18. Heater 31 is generally utilized only during start-up operations to supply heat for production of steam.

After the partially cooled effluent gas leaves mud drum 30, it is passed through line 45 and into heat exchanging relationship with water in a low pressure boiler 46 which is supplied with water through a line 47 communicating with line 34. The low pressure steam produced in boiler 46 is mixed with depressured steam leaving turbine 40 and any leftover pressure steam not required for mixture with the natural gas or for operation of the turbine and the resulting low pressure steam mixture is withdrawn from the system through line 48 for ultimate usage in a methanol purification operation not shown in the drawing.

As the reformer effluent leaves boiler 46 through line 49, the temperature thereof is approximately 299° F. The gas is further cooled to approximately 276° F. by passage in heat exchanging relationship with boiler water in a boiler feed water preheater 50. The reformer effluent gas leaving reformer 24 normally contains a substantial quantity of water vapor as indicated in Table II. This effluent is at a pressure of approximately 320 p.s.i.a. and, therefore, the reduction of the temperature to 276° F. results in the condensation of much of that water vapor. Condensed water is separated from the reformer effluent stream in a hot condensate separator 52 and then the stream is further cooled in a boiler make-up water preheater 54 where the effluent is passed in heat exchanging relationship with make-up water brought into the system through line 56. Thus, make-up water is heated and the reformer effluent is cooled, thereby causing further condensation of water which is separated from the effluent in a cold condensate separator 58.

The condensate separated in separators 52 and 58 is flashed into a carbon dioxide flash drum 60 and is then removed therefrom by condensate pump 62 for introduction into a de-aerator 64. Boiler blow-down drum 66 is connected to both boilers 32 and 46 and to the de-aerator 64 so that de-aeration can be accomplished by utilizing steam from drum 66 which would otherwise be lost when water is drained from drum 66 to control the solids content in the steam generation system. Likewise, boiler make-up water after passage through preheater 54 is injected into de-aerator 64 where the various streams are deaerated and collected for recycling. Boiler feed water pump 68 furnishes the impetus for this recycling with the boiler water being preheated in preheater 50 prior to its introduction into the respective boilers through lines 34 and 47.

Leaving separator 58, the reformer effluent stream is at a temperature of 100° F. and a pressure of 300 p.s.i.a. and has a composition as shown below in Table III.

TABLE III.—TYPICAL GAS COMPOSITION UPON INTRODUCTION INTO SYNTHESIS GAS COMPRESSION SYSTEM

| | Mols/hr. |
| --- | --- |
| Methane | 39.0 |
| Carbon dioxide | 151.7 |
| Carbon monoxide | 151.7 |
| Hydrogen | 1033.6 |
| Nitrogen | 8.9 |
| Water | 4.3 |

The bulk of the water has been removed from the reformer effluent and the heat evolved during such removal has been utilized for the production of steam as described above. The cooler and relatively water-free stream is compressed to a level of about 4400 p.s.i.a. in a series of stage synthesis gas compressors 70 where the heat of compression is removed and additional water condensed in intercoolers 72 and after-cooler 74. The compressed and cooled reformer effluent is passed through an oil separator 76 where compressor lubrication oil is removed. The steam passing from separator 76 into line 78 at a pressure of 4400 p.s.i.a. and a temperature of 110° F. has the same composition as shown in Table III above, except that the water has been reduced to 0.8 mols/hr.

A synthesis loop recycle gas portion is joined with the reformer effluent at juncture 80. The composition of the synthesis loop recycle gas is as shown below in Table IV:

TABLE IV.—SYNTHESIS LOOP RECYCLE GAS COMPOSITION

| | Mols/hr. |
| --- | --- |
| Methane | 1958.5 |
| Carbon monoxide | 385.3 |
| Carbon dioxide | 54.0 |
| Hydrogen | 12946.6 |
| Nitrogen | 404.6 |
| Water | 10.1 |
| Methanol | 46.9 |

After the recycle gas is combined with the reformer effluent in line 81, a synthesis gas of composition shown in Table V is formed:

TABLE V.—SYNTHESIS GAS COMPOSITION

| | Mols/hr. |
| --- | --- |
| Methane | 1997.5 |
| Carbon monoxide | 537.0 |
| Carbon dioxide | 205.7 |
| Hydrogen | 13980.1 |
| Nitrogen | 413.5 |
| Water | 10.9 |
| Methanol | 46.9 |

The synthesis gas is passed in heat exchange relationship with methanol converter effluent in methanol converter exchanger 82 to raise the temperature of the former to about 660° F. and lower the temperature of the latter to approximately 199° F. The hot synthesis gas is introduced into the top of methanol converter 84 where it is brought into contact with a suitable zinc-chromium catalyst for the conversion of at least a portion of the synthesis gas into methanol. Methanol converter output, having a composition as shown in Table VI, is withdrawn from the bottom of converter 84 and is passed in heat exchange relationship with the synthesis gas in exchanger 82 as previously described.

TABLE VI.—METHANOL CONVERTER OUTPUT

| | Mols/hr. |
| --- | --- |
| Methane | 2005.0 |
| Carbon monoxide | 394.5 |
| Carbon dioxide | 55.2 |
| Hydrogen | 13236.1 |
| Nitrogen | 413.5 |
| Water | 175.1 |
| Methanol | 320.0 |
| Dimethyl ether | 6.2 |

It is to be noted that a slight amount of methane has been formed in accordance with the methanation reaction, $CO+3H_2 \rightarrow H_2O+CH_4$. Also it is to be noted that a small quantity of dimethyl ether has been formed.

The converter output is further cooled to 110° F. by being passed in heat exchange relationship with cooling water in a methanol condenser 86. Downstream from condenser 86 is a methanol separator 88 where crude liquid methanol, having a composition as shown in Table VII, is separated from residual gas having a composition as shown in Table VIII.

TABLE VII.—CRUDE METHANOL

| | Mols/hr. |
|---|---|
| Methane | 4.1 |
| Carbon monoxide | 0.8 |
| Carbon dioxide | 0.1 |
| Hydrogen | 9.3 |
| Nitrogen | 0.8 |
| Water | 164.8 |
| Methanol | 272.1 |
| Dimethyl ether | 6.2 |

TABLE VIII.—RESIDUAL GAS

| | Mols/hr. |
|---|---|
| Methane | 2000.9 |
| Carbon monoxide | 393.6 |
| Carbon dioxide | 55.2 |
| Hydrogen | 13226.8 |
| Nitrogen | 412.7 |
| Water | 10.3 |
| Methanol | 47.9 |

The crude methanol product is conveyed to a methanol purification system, not shown in the drawing, through line 90. The residual gas is divided at juncture 92 and a portion, having a composition shown in Table IX, is purged from the recycle loop and sent through line 28 to reformer 24 to serve as fuel.

TABLE IX.—PORTION PURGED FROM LOOP

| | Mols/hr. |
|---|---|
| Methane | 42.4 |
| Carbon monoxide | 8.3 |
| Carbon dioxide | 1.2 |
| Hydrogen | 280.3 |
| Nitrogen | 8.1 |
| Water | 0.2 |
| Methanol | 1.0 |

The remaining portion of the residual gas has a composition as shown in Table IV above and is pressurized for recycling in recycle compressor 94.

Because of the hydrogen excess existing in the reformer effluent in line 78, it is obvious that a substantial purge of such excess hydrogen through line 28 is necessary. This forced purge prevents the build-up of inerts such as methane, nitrogen, argon and helium in the residual loop. Additionally, the excess hydrogen allows a build-up of hydrogen in the loop so that a hydrogen to carbon monoxide ratio of even 25 to 1 is readily obtainable. Thus, the rate of reaction in converter 84 may be optimized. Also, it is to be noted that the total concentration of carbon monoxide and carbon dioxide in the synthesis gas as shown in Table V above, amounts to less than 5% of the stream and, therefore, if a runaway methanation reaction should be initiated because of iron and nickel contamination of the methanol converter catalyst, the bed temperature rise will be only approximately 300° F. due to the cooling effect of the other 95% or so of the stream.

Examples of suitable catalysts for the process of this invention are set forth in Table X hereunder. The list is not intended to be exhaustive but simply illustrative of typical catalyst materials useful in promoting reforming of the hydrocarbon and synthesis of methanol in the reformer and converter sections respectively.

TABLE X.—CATALYSTS USABLE IN METHANOL PROCESS

| | Manufacturer | | | | | |
|---|---|---|---|---|---|---|
| Reforming catalysts type | Catalysts & Chemicals, Inc. | Girdler | Katalco (ICI) | Harshaw | Topsoe | BASF |
| Supported nickel oxide. | C11-2 C11-2S C11-2X C11-4 | G-56 G=56B G-56HT G-31 G-34 G-29 | 22-6 | Ni-0910 | RKS RK-21 | BZ |
| Nickel oxide on ceramic rings. | | | 54-1 | | | |
| Methanol Synthesis: Zinc chromite | | | | | Zn-0302 Zn-0308 Zn-0311 Zn-0312 | SMK | (*) |
| Copper containing | | | 51-1 | | | |

*No stock number applied to this catalyst.

In order to efficiently carry out the methanol synthesis process of this invention, certain processing conditions and parameters should be imposed on the system and the temperature, pressures, amount of purge from the recycle loop and $R_{Eff.}$ of the reformer effluent as well as the $R_{Eff.}$ of the inlet stream to the synthesis stage should be controlled and correlated.

First, the hydrocarbon chosen for reforming should be one that does not readily form elemental carbon and which will reform to produce a reformer effluent having an $R_{Eff.}$ within the range of about 2.06 to approximately 3.0 with from 0 to about 18% inerts (methane, nitrogen, argon, helium) when the reforming is carried out over a nickel catalyst in a reformer operated at a temperature within the range of about 1350° F. to approximately 1650° F. and at a pressure within the range of about 200 p.s.i.a. to approximately 1,000 p.s.i.a., with steam as the sole oxidation agent. Many natural gas, petroleum naphtha, LPG, and acetylene off gas compositions will meet these conditions.

The 18% limitation on inerts in the reformer effluent calculated on the dry weight basis of $$1_{Max.} = 412.53R_{Eff.} - 147.88R_{Eff.}^2 + 18.23R_{Eff.}^3 - 380.59$$

permits operation of the synthesis loop under efficient conditions in which the proportion of inerts in the infeed to the converter stage are limited to a maximum of about 50% during steady state operation of the synthesis plant.

In addition, the percent of gas purged from the synthesis loop through line 28 should not exceed a value calculated on the dry weight basis of percent Purge= $1.678R_{Eff.} - 3.465$.

When these conditions are met, the $R_{Eff.}$ of the infeed to the converter will always exceed about 10:1. Preferably though, the hydrocarbon composition chosen and the processing conditions and parameters employed should be such that the $R_{Eff.}$ will exceed 12:1.

Operation of the reformer at high pressure within the range of about 200 p.s.i.a. to approximately 1,000 p.s.i.a. has produced two significant effects which have unexpectedly more than offset the detriments (such as more unconverted methane and more reformed gas to be compressed) of high pressure operation as discussed earlier. Firstly, the high pressure of the reformer effluent causes the partial pressure of water vapor therein to be greater than in conventional methanol plants. This permits a significant increase in the quantity of water vapor which is condensable at an effective temperature level whereby to release its latent heat. Secondly, because the pressure of the effluent is high, the compression ratio in the synthesis gas compression system is greatly reduced and thus, the number of stages of compression may be held to a minimum. Furthermore, it has been found that total horsepower consumption is reduced in spite of the fact that a greater quantity of a gas must be compressed. As an example of the foregoing, the following table is illustrative of the savings in compression made available through employment of the method of the instant invention:

|  | Low pressure stoichiometric gas | High pressure synthesis gas |
| --- | --- | --- |
| Volumes compressed per mole of methanol | 3.25 | 4.5 |
| Inlet pressure, p.s.i.a | 50 | 300 |
| Outlet pressure, p.s.i.a | 4,400 | 4,400 |
| Pressure ratio | 88:1 | 14.67:1 |
| Number of compression stages | 4 | 3 |
| Pressure ratio per stage | 3.06 | 2.45 |
| Relative HP per volume of gas compressed | 12.24 | 7.35 |
| Relative HP per mole of methanol produced | 39.8 | 33.1 |

It is to be noted that in the low pressure case it has been assumed that 25% of the carbon oxides are present as carbon dioxide and thus 3.25 volumes are compressed rather than the theoretical 3 volumes as discussed earlier. On the same basis, in the high pressure case, 50% of the carbon oxides are present as carbon dioxide and 4.5 volumes are compressed rather than 4. These figures are in line with known criteria based on the higher permissible reforming temperature in a low pressure operation.

In addition, the improved purity of the methanol produced in the converter using the present process as compared with heretofore conventional methods is shown on a direct comparison basis in the following table:

TABLE XI.—COMPARISON OF METHANOL QUALITY—CONVENTIONAL PROCESS AGAINST IMPROVED PROCESS

| Makeup gas | Near stoichiometric conventional process | High H$_2$/CO |
| --- | --- | --- |
| Source | Natural gas | Natural gas |
| $R_{Eff.}$[2] | 2.02 | 2.91 |
| Percent inerts | 1.14 | 3.45 |
| Reformer outlet temperature, °F | 1,550 | 1,530 |
| Reformer outlet pressure, p.s.i.g | 45 | 305 |
| Synthesis: | | |
| Catalyst type | Zinc chromite | Zinc chromite |
| Recycle ratio [1] | 7.73 | 11.45 |
| $R_{Eff.}$[2] | 2.05 | 18.55 |
| Converter pressure, p.s.i.g | 5,000 | 4,200 |
| Catalyst outlet temperature, °F | 710 | 660 |
| Catalyst life, estimated | 1 year | 3–5 years |
| Methanol quality—Analysis of crude methanol, mols/100 mols CH$_3$OH: | | |
| Methyl formate | 0.15 | [3] N.D. |
| Acetone | 0.01 | N.D. |
| Dimethyl ether | 2.27 | 1.33 |
| Ethanol | 0.13 | N.D. |
| Propanol | 0.12 | N.D. |
| Butanol | 0.27 | N.D. |
| Methane produced | 2.76 | 0.14 |

[1] Defined as recycle quantity divided by makeup quantity.
[2] Effective H$_2$/CO ratio = (H$_2$−CO$_2$)/(CO+CO$_2$) in moles.
[3] None detected, less than 100 p.p.m.

Having thus described the invention, what is claimed as new and desired to be secured by Letters Patent is:

1. A continuous method for producing methanol comprising the steps of:

continuously passing a steam reformable hydrocarbon material under a pressure of from about 200 p.s.i.a. to approximately 1,000 p.s.i.a. through a reforming zone containing a catalyst for promoting reforming of the material, said hydrocarbon material being of a composition that upon reforming thereof the effective hydrogen to carbon monoxide ratio is within the range of about 2.06 to approximately 3 calculated in accordance with the formula $$R_{Eff.} = \frac{H_2 - CO_2}{CO + CO_2}$$

continuously introducing an oxidation agent into the reformer zone consisting essentially of steam;

raising the temperature of the material to a level within the range of about 1350° F. to approximately 1650° F. in said reforming zone to effect reforming of the material and thereby produce a synthesis zone feed stock containing hydrogen, carbon monoxide and carbon dioxide as primary components, and wherein any inert constituents in the reformed feed stock are limited to a level not exceeding a percentage figure calculated by the formula $$I_{Max.} \text{ percent} = 412.53 R_{Eff.} - 147.88 R_{Eff.}^2 + 18.23 R_{Eff.}^3 - 380.59$$

continuously introducing a quantity of said feed stock under a pressure of from about 500 p.s.i.a. to approximately 10,000 p.s.i.a. into a synthesis loop upstream from a methanol conversion zone containing a catalyst for promoting synthesis of methanol from the primary components of the feed stock whereby the synthesis zone output in the loop consists essentially of methanol, unconverted hydrogen, carbon monoxide and carbon dioxide along with water and any inert constituents introduced from the feed stock;

removing methanol from the synthesis zone output to produce a residual gas flow in the loop contaning the unreacted primary components and any inert constituents in the synthesis zone output; and removing a portion of gas from said residual flow as purge;

returning the remaining residual gas as recycle directly back into the synthesis loop upstream of the conversion zone for combination thereof with the feed stock, the proportion of gas removed from said residual flow as purge being maintained at a level such that the effective hydrogen to carbon monoxide ratio of the composition continuously directed to the synthesis zone and made up of feed stock plus recycle gas is maintained at a level of at least 10:1.

2. A method as set forth in claim 1 wherein is included the step of combusting at least a part of the purge gas removed from said residual flow and using the heat from said combustion to provide at least a portion of the heat required to raise the temperature of the material in said reforming zone.

3. A method as set forth in claim 1 wherein said step of passing a steam reformable hydrocarbon material through the reforming zone comprises directing natural gas to said reforming zone of a composition to meet the conditions of said $R_{Eff.}$ and $I_{Max.}$ formulas.

4. A method as set forth in claim 1 wherein said step of passing a steam reformable hydrocarbon material through the reforming zone directing an LPG product to said reforming zone of a composition to meet the conditons of said $R_{Eff.}$ and $I_{Max.}$ formulas.

5. A method as set forth in claim 1 wherein said step of passing a steam reformable hydrocarbon material through the reforming zone comprises directing acetylene off gas to said reforming zone of a composition to meet the conditions of said $R_{Eff.}$ and $I_{Max.}$ formulas.

6. A methold as set forth in claim 1 wherein said step of passing a steam reformable hydrocarbon material through the reforming zone comprises directing petroleum naphtha to said reforming zone of a composition to meet the conditions of said $R_{Eff.}$ and $I_{Max.}$ formulas.

References Cited

UNITED STATES PATENTS

| | | | |
|---|---|---|---|
| 1,791,568 | 2/1931 | Mittash et al. | 260—449.5 |
| 2,683,121 | 7/1954 | Vincent | 252—373 |
| 2,756,121 | 7/1956 | Grimes | 252—373 XR |
| 2,904,575 | 9/1959 | Peet | 260—449.5 |
| 2,946,754 | 7/1960 | Peet | 252—375 |
| 2,964,551 | 12/1960 | Woolcock | 260—449.5 |
| 3,064,029 | 11/1962 | White | 260—449.5 |
| 3,071,453 | 1/1963 | James | 260—449.5 XR |

FOREIGN PATENTS

| | | |
|---|---|---|
| 697,244 | 11/1964 | Canada. |
| 916,216 | 1/1963 | Great Britain. |
| 953,877 | 4/1964 | Great Britain |

OTHER REFERENCES

Hougen et al., Chemical Process Principles, John Wiley & Sons, New York, 1943, pp. 190–191.

LEON ZITVER, Primary Examiner

H. T. MARS, Assistant Examiner

U.S. Cl. X.R.

252—373.